United States Patent
McLean (10) Patent No.: US 9,537,974 B2
(45) Date of Patent: Jan. 3, 2017

(54) SYSTEMS, METHODS AND MEDIA FOR COLLABORATIVE CACHING OF FILES IN CLOUD STORAGE

(71) Applicant: AppSense Limited, Warrington (GB)

(72) Inventor: Ian James McLean, Lymm (GB)

(73) Assignee: Crimson Corporation, Dover, DE (US)

( * ) Notice: Subject to any disclaimer, the term of this patent is extended or adjusted under 35 U.S.C. 154(b) by 592 days.

(21) Appl. No.: 13/935,031

(22) Filed: Jul. 3, 2013

(65) Prior Publication Data
US 2015/0012639 A1    Jan. 8, 2015

(51) Int. Cl.
*G06F 15/173*    (2006.01)
*H04L 29/08*    (2006.01)

(52) U.S. Cl.
CPC ......... *H04L 67/306* (2013.01); *H04L 67/1044* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 7,546,571 B2* | 6/2009 | Mankin | ............... | G06F 17/5045 700/103 |
| 7,657,548 B2* | 2/2010 | Seiler | ............... | G06Q 10/109 707/999.1 |
| 2003/0140067 A1* | 7/2003 | Sesek | ............... | H04N 1/32101 |
| 2004/0249902 A1* | 12/2004 | Tadayon | ........... | G06F 17/30067 709/207 |
| 2005/0149619 A1* | 7/2005 | Cowan | ................... | H04L 29/06 709/207 |
| 2007/0204011 A1 | 8/2007 | Shaver et al. | | |
| 2007/0220068 A1* | 9/2007 | Thompson | .......... | G06F 17/3023 |
| 2008/0147876 A1 | 6/2008 | Campbell et al. | | |
| 2008/0155109 A1 | 6/2008 | Khedouri et al. | | |
| 2009/0006536 A1* | 1/2009 | Elliott | ................. | H04L 12/1881 709/203 |
| 2009/0276543 A1 | 11/2009 | Turner et al. | | |
| 2010/0005138 A1* | 1/2010 | Manzano | .............. | G06F 3/0486 709/203 |

(Continued)

OTHER PUBLICATIONS

Merriam-Webster, definition of "monitor," 2 pages, May 18, 2013.*

(Continued)

*Primary Examiner* — Joshua Joo
(74) *Attorney, Agent, or Firm* — Austin Rapp & Hardman (57) ABSTRACT

Systems, methods and media are provided for collaborative caching of files in a cloud storage directory. One method includes providing, at a cloud storage server having a cloud storage directory, an interface configured for forming one or more groups. Each group has a plurality of members. The method also includes monitoring the cloud storage directory including a plurality of files that is shared amongst members of a working group and, upon detecting a file activity related to one of the plurality of files, updating a profile for the file. The method further includes determining using the updated profile whether to distribute the file to the group members by applying a policy to the updated profile. The method also includes distributing the file to the group members by downloading the file to cloud storage devices associated with the group members when it is determined to distribute the file.

14 Claims, 3 Drawing Sheets

(56) References Cited

U.S. PATENT DOCUMENTS

| | | | |
|---|---|---|---|
| 2011/0276998 A1* | 11/2011 | Griffin | H04L 47/6215 725/56 |
| 2012/0110445 A1* | 5/2012 | Greenspan | G06F 17/24 715/256 |
| 2012/0210068 A1 | 8/2012 | Joshi et al. | |
| 2013/0080919 A1* | 3/2013 | Kiang | H04L 67/327 715/753 |
| 2013/0081072 A1* | 3/2013 | Alward | H04L 12/189 725/14 |
| 2014/0082091 A1* | 3/2014 | Rexer | G06F 15/17306 709/205 |
| 2014/0172798 A1* | 6/2014 | Falkenburg | G06F 17/30174 707/636 |
| 2015/0067174 A1* | 3/2015 | Crowe | H04L 67/2847 709/226 |

OTHER PUBLICATIONS

"Microsoft App-V", http://en.wikipedia.org/w/index.php?title=Microsoft_App-V&printable=yes, printed on May 8, 2013, 6 pages.

"Rsync", http://en.wikipedia.org/w/index.php?title=Rsync&printable=yes, printed on May 8, 2013, 5 pages.

"Server Message Block", http://en.wikipedia.org/w/index.php?title=Server_Message_Block&printable=yes, printed on May 8, 2013, 6 pages.

* cited by examiner

SYSTEMS, METHODS AND MEDIA FOR COLLABORATIVE CACHING OF FILES IN CLOUD STORAGE

TECHNICAL FIELD

Disclosed systems, methods and media relate to collaborative caching of files. Specifically, disclosed systems, methods and media relate to collaborative caching of files in a cloud storage directory managed at a cloud storage server.

BACKGROUND

Cloud storage is a model of networked enterprise storage where data is stored not only in users' computers but also in virtualized pools of storage that are generally hosted by third party companies. Hosting companies operate large data centers and the data center operators virtualize necessary disk and other resources in the background in accordance with the requirements of the users. The virtualized disk and other resources are exposed as storage pools to which the users store files and other data objects.

Cloud storage client devices often use client software program(s) to upload and download files from a cloud storage server. The client software program(s) running on a cloud storage client device can provide a user with a view onto a very large number of files stored in a cloud storage directory. For performance reasons, among others, however, it is not always desirable to download all of those files prior to use. Existing cloud storage client solutions either retrieve/download a file on demand or do not present a file to a user at all until that file is resident on the user's cloud storage client device.

SUMMARY

In accordance with the disclosed subject matter, systems, methods and media are provided for collaborative caching of files. Specifically, disclosed systems, methods and media provide for collaborative caching of files in a cloud storage directory managed at a cloud storage server. For example, the disclosed subject matter provides a method that includes providing, at a cloud storage server having a cloud storage directory, an interface configured to enable a user to form one or more groups, wherein each group has a plurality of group members. The method also includes monitoring the cloud storage directory containing a plurality of files that is shared amongst group members of a working group of the one or more groups and, upon detecting a file activity related to one of the plurality of files, updating a profile associated with the active file. The method further includes determining based on the updated profile whether it is desirable to distribute the active file to at least one working group member by applying a configurable file-distribution policy to the updated profile. The configurable file-distribution policy includes at least one rule. When it is determined to distribute the active file, the method also includes distributing the active file to the at least one working group member by downloading a copy of the active file to one or more cloud storage client devices associated with the at least one working group member.

In one embodiment, the file activity includes the active file's being downloaded from the cloud storage directory to a working group member's cloud storage client device at the member's request. The profile is updated for one of (1) incrementing a total number, or (2) re-calculating a percentage, of working group members who downloaded the active file at their own requests. The configurable file-distribution policy includes a popularity rule that can help determine whether to distribute preemptively the active file by providing a predetermined minimum number of the first working group members (who have downloaded the active file) for triggering a preemptive distribution of the file. The at least one working group member includes the remaining members of the group who have not yet downloaded the file.

In another embodiment, the file activity includes the active file's being revised by one of the working group members who has a write-privilege with respect to the active file. The profile is updated to change date and time that the active file is last revised. The configurable file-distribution policy includes a file-revision rule that, when a file is revised by a group member holding a write-privilege with respect to the file, directs the cloud storage server to download preemptively download the file to at least one working group member's cloud storage client device(s). The at least one working group member includes all of the remaining working group members.

The disclosed subject matter also includes an apparatus comprising one or more interfaces configured to provide communication with at least one cloud storage client device over a network, a cloud storage directory including a plurality of files, and a processor. The processor is in communication with the cloud storage directory and the one or more interfaces and configured to run a cloud storage server module stored in memory. The cloud storage server module is in turn configured to provide a user interface configured to enable a user to form one or more groups, wherein each group has a plurality of group members. The cloud storage server module is also configured to monitor the cloud storage directory, wherein the plurality of files in the directory is shared amongst group members of a first working group of the one or more groups, and update a profile associated with one of the plurality of files upon detecting a file activity related to the active file. The cloud storage server module is further configured to determine based on the updated profile whether it is desirable to distribute the active file to at least one first working group member by applying a configurable file-distribution policy to the updated profile. The configurable file-distribution policy includes at least one rule. The cloud storage server is also configured to distribute the active file to the at least one first working group member by downloading a copy of the active file to one or more cloud storage client devices associated with the at least one first working group member when it is determined to distribute the active file.

The disclosed subject matter further includes a non-transitory computer readable medium. The computer readable medium includes executable instructions operable to cause an apparatus including a cloud storage directory to provide an interface configured to enable a user to form one or more groups, wherein each group has a plurality of group members. The executable instructions are also operable to cause the apparatus to monitor the cloud storage directory including a plurality of files that is shared amongst group members of a working group of the one or more groups and, upon detecting that one of the plurality of files is downloaded from the cloud storage directory to a working group member's cloud storage client device at the member's request, update a profile associated with the file by at least one of (1) incrementing a total number, or (2) re-calculating a percentage, of the working group members who downloaded the file at their own requests.

The executable instructions are further operable to cause the apparatus to determine based on the updated profile whether it is desirable to distribute the file to at least one working group member by applying a popularity rule included in a configurable file-distribution policy to the updated profile. The popularity rule can help determine whether to distribute the file by providing a predetermined minimum number of group members (who have downloaded the file) for triggering a preemptive distribution of the file. When it is determined to distribute the file, the executable instructions are also operable to cause the apparatus to distribute the file to all of the remaining members of the working group by downloading a copy of the file to a plurality of cloud storage client devices associated with all of the remaining members of the working group.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be had to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems, methods and media of the disclosed subject matter and the environment in which such systems, methods and media may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems, methods and media that are within the scope of the disclosed subject matter.

The disclosed subject matter relates to systems, methods and media for collaborative caching of files. Specifically, the disclosed systems, methods and media are provided for preemptive downloading of certain files in a cloud storage directory based on group activity to keep the files synchronized.

In one embodiment, for example, a sociology professor in a university teaches a graduate course having a class of 50 students. The professor places a set of files, each file including a recently published sociology research paper, in a cloud storage directory for her students and asks each student to prepare a presentation on a sociology topic of his/her selection based on the published research papers. The professor connects to a cloud storage server managing the cloud storage directory and creates a group that includes her students as group members via a graphical user interface provided by the cloud storage server. The professor then associates the new group with the cloud storage directory and generates a configurable file-access policy for the files in the cloud storage directory.

The professor configures the file-access policy such that, if any of the files in the cloud storage directory is downloaded by 25 students in the group (i.e., in the class), the cloud storage server preemptively sends the popular file to the rest of the group members (i.e., the remaining 25 students who have not yet downloaded the file). For example, a software module/process running on the cloud storage server monitors the cloud storage directory and detects activities related to the files in the directory. Each time a file is downloaded by a group member for the first time, the cloud storage server module detects it and updates the file's access status information, e.g., by incrementing a download-counter associated with the file. If the download-counter is incremented to 25 (i.e., when the 25th student downloads the file), for instance, the cloud storage server module preemptively download the file from the cloud storage directory to cloud storage client devices associated with the remaining 25 students.

Figure 1:
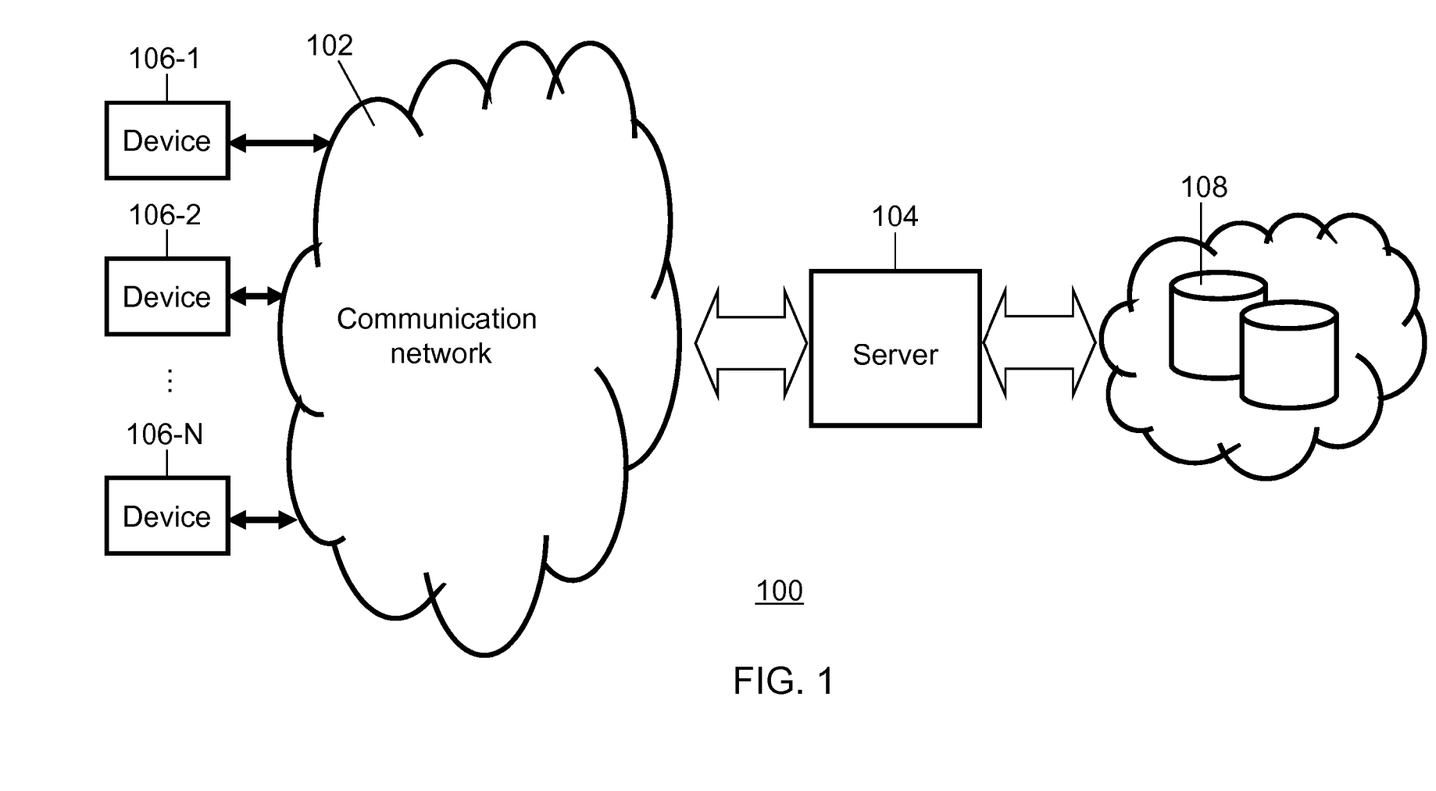
FIG. 1 illustrates a diagram of a networked communication system in accordance with an embodiment of the disclosed subject matter.

FIG. 1 illustrates a diagram of a networked communication arrangement 100 in accordance with an embodiment of the disclosed subject matter. Networked communication arrangement 100 can include a communication network 102, a cloud storage server 104, at least one cloud storage client device 106 (e.g., client devices 106-1, 106-2, . . . 106-N), and a database 108.

Each cloud storage client device 106 can send data to, and receive data from, cloud storage server 104 over communication network 102. Each cloud storage client device 106 can be directly coupled to cloud storage server 104; alternatively, each cloud storage client device 106 can be connected to cloud storage server 104 via any other suitable device(s), communication network(s), or combination thereof. For example, each cloud storage client device 106 can be coupled to cloud storage server 104 via one or more routers, switches, access points, and/or communication networks (as described below in connection with communication network 102).

A cloud storage client device 106 can include a desktop computer, a mobile computer, a tablet computer, a cellular device, a smartphone or any computing system that is capable of performing computation and runs one or more cloud storage client software programs. For example, a cloud storage client device 106 can be a mobile station running a cloud storage client driver that can interact with files in a cloud storage directory coupled to cloud storage server 104. Cloud storage server 104 can be a single server, or a network of servers, or a farm of servers in a data center.

Communication network 102 can include a network or combination of networks that can accommodate private data communication. For example, communication network 102 can include a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. Such networks may be implemented with any number of hardware and software components, transmission media and network protocols. FIG. 1 shows communication network 102 as a single network; however, communication network 102 can include multiple interconnected networks listed above.

Cloud storage server 104 can be coupled to one or more database systems. Database 108 can include at least one of two types of database: a local database and a remotely located database. Database 108 can include any data supported by one or more of data structures; alternatively, it could include one or more database management system (DBMS) or a distributed database. For example, database 108 may include a data structure, or one or more data tables in a DBMS, for storing information related to one or more cloud storage directories and files contained in the directories. Database 108 can also include at least one of a relational database, object database (a.k.a., object-oriented database), XML database, cloud database, active database, and a data warehouse. Database 108 may include at least one physical, non-transitory storage medium.

In some embodiments, database 108 can be provided as an enterprise system in a corporate environment. For example, communication network 102, cloud storage server 104, cloud storage client devices 106, and database 108 can be located in a close proximity and can be a part of a single company. In some cases, cloud storage server 104, cloud storage client devices 106, and database 108 can be located in the same building and can be coupled to one another via a local communication network. The local communication network can include a local area network (LAN), a corporate network, and a virtual private network (VPN) associated with the corporate network. FIG. 1 shows database 108 as separate from communication network 102. However, database 108 can be part of communication network 102 or another communication network.

Figure 2:
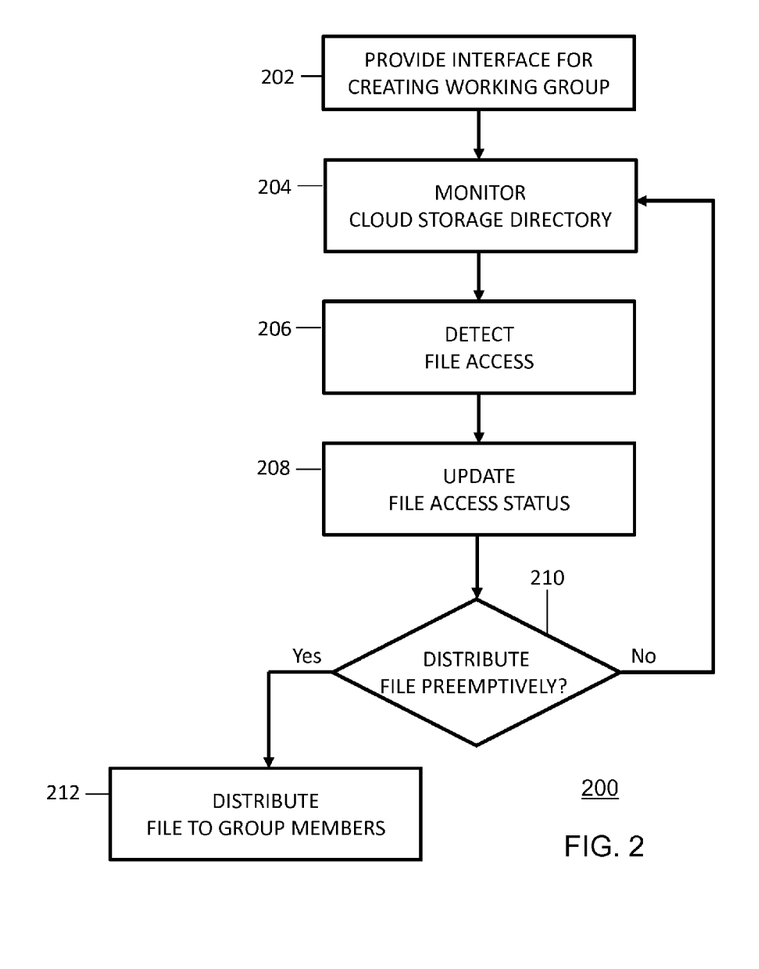
FIG. 2 is a flow diagram for collaborative caching of files in a cloud storage directory in accordance with certain embodiments of the disclosed subject matter.

FIG. 2 is a flow diagram 200 for collaborative caching of files in a cloud storage directory in accordance with certain embodiments of the disclosed subject matter. At 202, a user interface is provided for creating a working group including a plurality of group members. For example, a cloud storage server (e.g., cloud storage server 104) can provide a user interface for creating and updating a group. In some embodiments, the user interface is a graphical user interface. In some embodiments, only a user with an administrator privilege is permitted to create a group. A working group may be a group that is created to facilitate collaboration amongst its members towards common goals or interests. For example, a working group may be created to facilitate collaboration amongst research professionals who are interested in identifying and measuring impacts caused by sudden climate changes, or amongst members of an editorial committee (e.g., for an academic magazine, etc.) who review research papers that are submitted for publication and determine which specific papers to publish each month.

In some embodiments, the user interface is configured to enable a user to link a cloud storage directory to a selected group such that the members of the selected group can access/modify one or more files stored in the cloud storage directory. In some embodiments, the user interface is also configured to enable the user to add one or more additional members to, or remove one or more existing members from, a selected group. In some embodiments, the user interface is further configured to enable the user to change a privilege level of group members, including a read-privilege, a write-privilege and an administrator privilege.

At 204, a cloud storage directory is monitored for file activities. For example, a cloud storage server can monitor a cloud storage directory that is associated with one or more groups for file activities. In some embodiments, a cloud storage directory including a plurality of files is monitored for file activities, such as downloading of one or more of the plurality of files from, or revising one or more files in, the storage directory. The cloud storage directory may include one or more files, each containing a document (e.g., a spreadsheet, a text or word processing document, a document containing presentation slides, etc.) or multimedia content (music file, movie clip, etc.). In some embodiments, the cloud storage directory resides at a cloud storage server, such as cloud storage server 104. In some embodiments, the cloud storage directory resides at a database, such as database 108, that is coupled to the cloud storage server.

At 206, file access/activities are detected. For example, the cloud storage server monitoring a cloud storage directory can detect downloading from the directory one or more files to a cloud storage client device by a group member using/operating the client device. The cloud storage server may also detect uploading to the directory one or more files from the cloud storage client device. For example, the group member can (if the member has a write-privilege) download a particular file, revise the content of it and upload the revised file back to the directory. The group member can also upload a new file to the directory.

A 208, file access status for one or more files affected by the file activities is updated. For example, the cloud storage server, having detected one or more file activities, can update a profile for the files associated with the file activities. For instance, the cloud storage server can increment a download-counter associated with a file in the cloud storage directory each time a group member downloads the file for the first time. The cloud storage server can also update a file's access status when the file is revised by, e.g., updating the date and time that the file is last revised. In one embodiment, the cloud storage server also reset the download-counter of the revised file. In yet another embodiment, the cloud storage server creates a second download-counter to record downloading of the file after the file is revised. In some embodiments, the profile is implemented using extended file metadata.

At 210, it is determined based on the updated profile whether it is desirable to distribute a file preemptively to at least one other group member. For example, the cloud storage server can apply one or more rules included in a configurable, file-distribution policy, to the updated profile of a file to determine whether to distribute the file. For instance, the file-distribution policy may include a popularity rule that recommends for distribution of a file if the file is accessed/downloaded by a certain number, or a percentage, of members in a group. In some embodiments, the user interface provided to enable a user to create one or more working group is also configured to enable the user to create and update (reconfigure) the file-distribution policy. For instance, the user may add new rules to, or delete/modify existing rules in, the policy.

If it is determined at 210 based on the updated profile of a file that it is not desirable (e.g., not popular enough) to distribute the file, the file is not distributed. For example, the cloud storage server would not perform any further action with respect to the file and simply goes back to 204 and continue monitoring the relevant cloud storage directory. If, however, it is determined at 210 that it is desirable (e.g., popular enough) to distribute the file preemptively, the file is distributed to one or more members of the group at 212. If, for instance, the file-distribution policy includes a popularity rule recommending a preemptive distribution of a file if the file is downloaded by 50% of the group members, the cloud storage server can preemptively distribute the file to the remaining 50% of the group members who have not yet downloaded the file by downloading a copy of the file to cloud storage client devices associated with the remaining members.

In some embodiments, a file is distributed when the decision to distribute the file is made. For example, the cloud storage server can distribute a file upon making the decision to distribute the file. In some embodiments, the file is distributed some time after the decision to distribute the file is made, e.g., at a quiet time of a working day, such as late evening or early morning hours, or when a network traffic condition is desirable, such as when the network is not congested with heavy traffic or when a user's cloud storage client device can be connected to the server via the least expensive connection.

In some embodiments, a file is also distributed to some or all members of a different working group that is closely associated with the first group. For instance, if two groups are linked to one another, e.g., for pursuing similar goals or interest(s) or for sharing a certain number of overlapping members, a file that is found to be popular in one of the two groups can be distributed not only to those members of the group who have not yet downloaded the file but also to some or all members of the other group.

Figure 3:
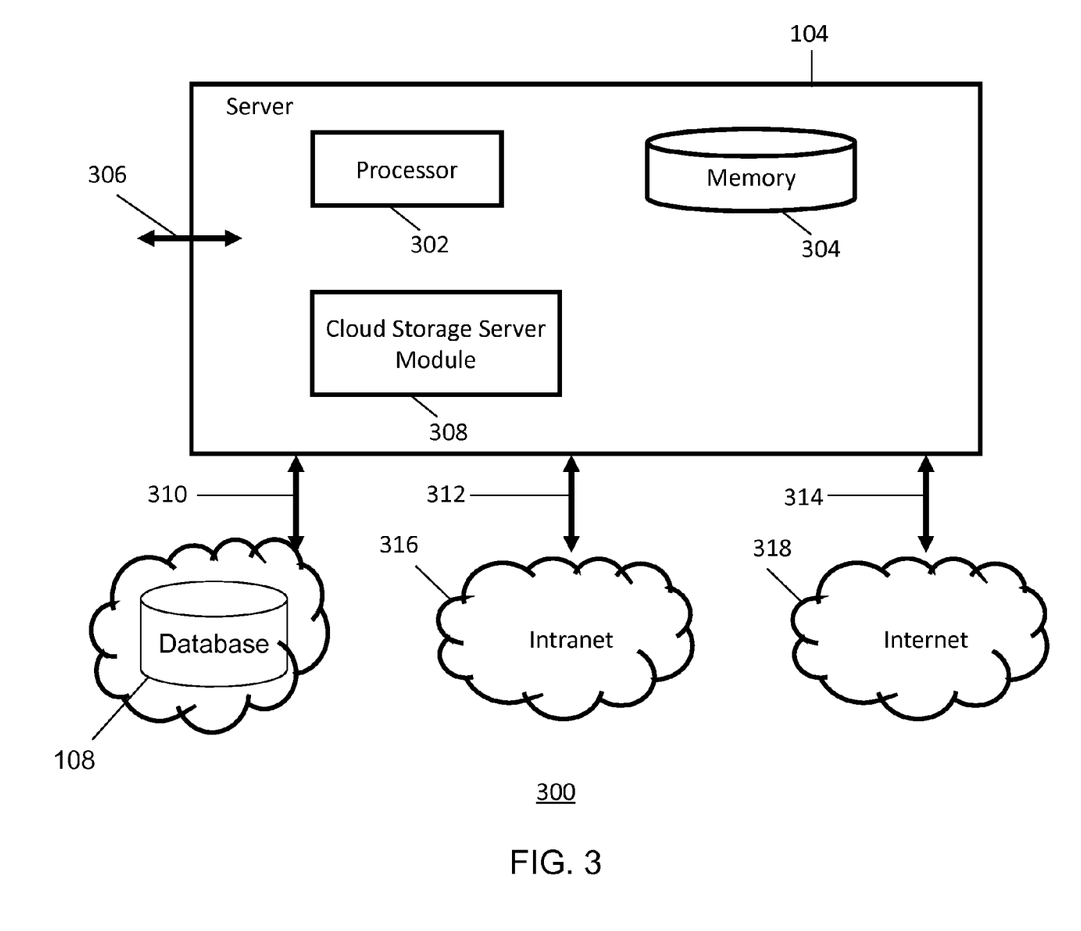
FIG. 3 is a block diagram of a cloud storage server in accordance with certain embodiments of the disclosed subject matter.

FIG. 3 is a block diagram 300 of a cloud storage server in accordance with certain embodiments of the disclosed subject matter. Block diagram 300 shows a cloud storage server 104, which includes a processor 302, a memory 304, interfaces 306, 310, 312, and 314, and a cloud storage server module 308. Block diagram 300 shows cloud storage server 104 communicatively coupled to a database 108, an Intranet 316, and the Internet 318. Memory 304 and interfaces 306, 310, 312, and 314 are communicatively coupled to processor 302. Cloud storage server 104 can communicate with cloud storage client devices 106 (not shown) via interface 306; cloud storage server 104 can communicate with database 108 via interface 310; cloud storage server 104 can communicate with Intranet 316 via interface 312; and cloud storage server 104 can communicate with the Internet 318 via interface 314. Interfaces 306, 310, 312, and 314 are shown as separate interfaces but may be the same physical interface. Processor 302 can run software programs and modules, including cloud storage server module 308. Memory 304 is capable of storing data that can be used by processor 302 to run the software programs and modules. For example, memory 304 may include a cloud storage directory including a plurality of files. In some embodiments, database 108 also includes one or more cloud storage directories.

Cloud storage server module 308 can be configured to communicate, or interact, with one or more cloud storage client devices 106 through interface 306 for collaborative caching of files. For example, cloud storage server module 308 can provide a user interface that is configured to enable a user to form one or more groups, each of which includes a plurality of group members. Cloud storage server module 308 can also monitor the cloud storage directory including a plurality of files that is shared amongst group members of a working group of the one or more groups. Upon detecting a file activity (e.g., downloading a copy of a file, revising a file, etc.) related to one of the plurality of files, cloud storage server module 308 can update a profile (e.g., extended file metadata) associated with the file and determine based on the updated profile whether it is desirable to distribute the file to at least one working group member by applying a configurable, file-distribution policy to the updated profile. If it is determined to distribute the file, cloud storage server module 308 can preemptively (i.e., without a request) distribute the file, e.g., by downloading a copy of the file to one or more cloud storage client devices associated with the at least one working group member.

FIG. 3 shows a cloud storage server 104 having cloud storage server module 308 that performs the above-described operations in accordance with certain embodiments of the disclosed subject matter. Cloud storage server 104 may include additional modules, fewer modules, or any other suitable combination of modules that perform any suitable operation or combination of operations.

Interfaces 306, 310, 312, and 314 provide an input and/or output mechanism to communicate over a network. Interfaces 306, 310, 312, and 314 enable communication with cloud storage client devices 106, as well as other network nodes in communication network 102. Interfaces 306, 310, 312, and 314 can be implemented in hardware to send and receive signals in a variety of mediums, such as optical, copper, and wireless, and in a number of different protocols some of which may be non-transient.

Cloud storage server 104 can operate using operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

The cloud storage server's software can be divided into a series of tasks that perform specific functions. These tasks communicate with each other as needed to share control and data information throughout the server 104. A task can be a software process that performs a specific function related to system control or session processing. Three types of tasks operate within cloud storage server 104 in some embodiments: critical tasks, controller tasks, and manager tasks. The critical tasks control functions that relate to the server's ability to process calls such as server initialization, error detection, and recovery tasks. The controller tasks can mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem includes critical tasks, controller tasks, and manager tasks. Some of the subsystems that run on cloud storage server 104 include a system initiation task subsystem, a high availability task subsystem, a shared configuration task subsystem, and a resource management subsystem.

The system initiation task subsystem is responsible for starting a set of initial tasks at system startup and providing individual tasks as needed. The high availability task subsystem works in conjunction with the recovery control task subsystem to maintain the operational state of cloud storage server 104 by monitoring the various software and hardware components of cloud storage server 104. Recovery control task subsystem is responsible for executing a recovery action for failures that occur in cloud storage server 104 and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

Shared configuration task subsystem can provide cloud storage server 104 with an ability to set, retrieve, and receive notification of server configuration parameter changes and is responsible for storing configuration data for the applications running within cloud storage server 104. A resource management subsystem is responsible for assigning resources (e.g., processor and memory capabilities) to tasks and for monitoring the task's use of the resources.

In some embodiments, cloud storage server 104 can reside in a data center and form a node in a cloud computing infrastructure. Cloud storage server 104 can also provide services on demand. A module hosting a client is capable of migrating from one server to another server seamlessly, without causing program faults or system breakdown. Cloud storage server 104 on the cloud can be managed using a management system.

Cloud storage client device 106 can include user equipment. The user equipment communicates with one or more radio access networks and with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

Cloud storage client device 106 also includes any platforms capable of computations and communication. Non-limiting examples can include televisions (TVs), video projectors, set-top boxes or set-top units, digital video recorders (DVR), computers, netbooks, laptops, and any other audio/visual equipment with computation capabilities. Cloud storage client device 106 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. Cloud storage client device 106 can also provide a variety of user interfaces such as a keyboard, a touch screen, a trackball, a touch pad, and/or a mouse. Cloud storage client device 106 may also include speakers and a display device in some embodiments.

The disclosed subject matter relates to systems, methods and media that are provided for downloading certain files in a cloud storage directory based on group activity to keep the files synchronized. In one embodiment, for example, a graduation committee of a history department in a university includes 5 professors and 7 Ph.D. candidates who are working on individual theses. The department secretary connects (e.g., logs into) to a cloud storage server (e.g., cloud storage server 104) and, via a graphical user interface provided by the server, forms a collaborative group including the 5 faculty members and 7 student candidates, creates a configurable file-distribution policy, creates a new cloud storage directory and links the policy to the directory and the directory to the group. The cloud storage directory includes the draft Ph.D. theses of the 7 candidates as well as a number of published research papers for the group. The department secretary grants a reviewer-privilege to the faculty members but grants only ordinary read/write-privileges to the candidates.

One of the 5 professors (first professor) decides to review and critique a draft Ph.D. thesis prepared by one of her students. The first professor downloads a file containing the draft thesis, reviews the thesis, adds her comments and uploads the thesis back to the cloud storage directory. A cloud storage server module running on the cloud server monitoring the cloud storage directory detects that the file has been revised and updates the file's information included in its profile. For instance, the cloud storage server module updates the date and time the file is last revised and increments a revision-counter of the file, thereby indicating that the file has been reviewed and commented. The server module then preemptively distributes the critiqued thesis to only the remaining faculty members in the group for their comments in accordance with the faculty-review rule included in the configurable file-distribution policy. The faculty-review rule requires that all 5 faculty members be given an opportunity to review and comment on a draft thesis before the thesis is returned to its author for the his/her review as well for a review by remaining students.

Each time one of the remaining four faculty members downloads the critiqued thesis, reviews it and uploads the thesis with her own comments back to the directory, the server module increment the review-counter. When all five of the group's faculty members finish critiquing the thesis, the server module places the critiqued thesis for the students' review. If more than 3 of the 7 student candidates download the critiqued thesis, then the thesis is preemptively distributed to the remaining students for their review of the critiques in accordance with the popularity-rule in the file-distribution policy.

The student who prepared the original version of the critiqued thesis downloads and revises her thesis in accordance with the comments provided by the faculty members and uploads the revised thesis back to the directory. The server module detects that the critiqued thesis has been revised and distributes the file to the rest of the group members (faculty and student members alike) in accordance with the revision rule included in the file-distribution policy. The revision rule requires that any revision to a thesis exclusive of faculty critiques be made available preemptively for inspection/review by all members of the group.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method, comprising:
   providing, at a cloud storage server having a cloud storage directory, an interface configured to enable a user to form one or more groups, each group having a plurality of group members;
   monitoring the cloud storage directory including a plurality of files that is shared amongst a plurality of group members of a working group of the one or more groups;
   detecting a file activity related to one of the plurality of files, wherein the one of the plurality of files is an active file, and wherein the file activity includes the active file's being revised by one of the group members of the one or more groups who has a write-privilege with respect to the active file;
   upon detecting the file activity, updating a profile associated with the active file to change date and time that the active file is last revised;
   determining, based on the updated profile, whether to distribute the active file to at least one working group member by applying a configurable file-distribution policy that includes at least one rule to the updated profile, wherein the configurable file-distribution policy includes a file-revision rule that, when a file is revised by a working group member holding a write-privilege with respect to the file, directs the cloud storage server to download preemptively the file to a cloud storage client device of the at least one working group member, and wherein the at least one working group member includes all of remaining working group members who hold the write-privilege;
   when it is determined to distribute the active file, distributing the active file by downloading a copy of the active file to one or more cloud storage client devices associated with the at least one working group member;
   determining, based on the updated profile, whether the active file's revision is approved by all of the remaining working group members holding the write-privilege; and
   when it is determined that the active file's revision is approved by all of the remaining working group members holding the write-privilege, distributing the active file to rest of the group members of the one or more groups by downloading a copy of the active file to cloud storage client devices associated with the rest of the working group members,
   wherein the file activity further includes the active file being approved for the revision by a working group member holding the write-privilege, and
   wherein the updated profile is further updated to increment a total number of working group members holding the write-privilege who approved the revision.

2. The method of claim 1,
   wherein the file activity includes the copy of the active file being downloaded from the cloud storage directory to a working group member's cloud storage client device at a request of the working group member,
   wherein the updated profile is further updated for one of (1) incrementing a total number, or (2) re-calculating a percentage, of working group members who requested to download the copy of the active file,
   wherein the configurable file-distribution policy includes a popularity rule that helps determine whether to distribute preemptively the active file by providing a predetermined minimum number of working group members who have downloaded the copy of the active file for triggering a preemptive distribution of the active file, and
   wherein the at least one working group member includes remaining working group members who have not yet downloaded the copy of the active file.

3. The method of claim 1, wherein the user includes an individual with a system administrator privilege for the cloud storage server.

4. The method of claim 1, wherein the interface includes a graphical user interface (GUI) and wherein the interface is further configured to enable the user to perform one or more of: (1) adding one or more additional members to a selected group, (2) removing one or more members from a selected group, (3) reconfiguring the configurable file-distribution policy, and (4) changing a privilege level of one or more members of a selected group, the privilege level including a write-privilege, a read-privilege and an administrator privilege.

5. The method of claim 1, wherein the active file is distributed either (1) upon making the determination to distribute the active file, (2) after making the determination to distribute the active file, (3) upon detecting each of the one or more cloud storage client devices, or (4) when each of the one or more cloud storage client devices is connected using a network having a predetermined minimum bandwidth or quality of service (QoS).

6. The method of claim 1, wherein the profile includes an extended metadata of the active file and wherein the cloud storage client device of the working group member includes a mobile device.

7. An apparatus, comprising:
one or more interfaces configured to provide communication with at least one cloud storage client device over a network;
a cloud storage directory including a plurality of files; and
a processor, in communication with the cloud storage directory and the one or more interfaces, configured to run a cloud storage server module stored in memory that is configured to:
provide a user interface configured to enable a user to form two or more groups, each group having a plurality of group members;
monitor the cloud storage directory including the plurality of files, wherein the plurality of files is shared amongst a plurality of group members of a first working group of the two or more groups, and wherein some of the group members of the first working group are also members of a second working group of the two or more groups;
detect a file activity related to one of the plurality of files, wherein the one of the plurality of files is an active file, and wherein the file activity includes a copy of the active file being downloaded from the cloud storage directory to a working group member's cloud storage client device at a request from the working group member;
upon detecting the file activity, update a profile associated with the active file, wherein the profile is updated for one of (1) incrementing a total number, or (2) re-calculating a percentage, of working group members who requested to download the copy of the active file;
determine, based on the updated profile, whether to distribute the active file to at least one working group member by applying a configurable file-distribution policy that includes at least one rule to the updated profile, wherein the configurable file-distribution policy includes a popularity rule that helps determine whether to distribute preemptively the active file by providing a predetermined minimum number of working group members who have downloaded the copy of the active file for triggering a preemptive distribution of the file;
when it is determined to distribute the active file, distribute the active file by downloading a copy of the active file to one or more cloud storage client devices associated with the at least one working group member, wherein the at least one working group member includes remaining working group members who have not yet downloaded the copy of the active file; and
distribute the active file to all members of the second working group when a total number of the group members of the first working group who are also members of the second working group exceeds a predetermined threshold number included in the configurable file-distribution policy.

8. The apparatus of claim 7, wherein the updated profile includes an extended file metadata and wherein the user interface includes a graphical user interface (GUI).

9. The apparatus of claim 7, wherein the user interface is further configured to enable the user to perform one or more of: (1) adding one or more additional members to a selected group, (2) removing one or more members from a selected group, (3) reconfiguring the configurable file-distribution policy, and (4) changing a privilege level of one or more members of a selected group, the privilege level including a write-privilege, a read-privilege and an administrator privilege.

10. The apparatus of claim 7, wherein the active file is distributed either (1) upon making the determination to distribute the active file, (2) after making the determination to distribute the active file, (3) upon detecting each of the one or more cloud storage client devices, or (4) when each of the one or more cloud storage client devices is connected using a network having a predetermined minimum bandwidth or quality of service (QoS).

11. The apparatus of claim 7,
wherein the file activity includes the active file being revised by one of the group members of the two or working groups who has a write-privilege with respect to the active file,
wherein the profile is updated to change date and time that the active file is last revised, and
wherein the configurable file-distribution policy includes a file-revision rule that, when a file is revised by a working group member holding a write-privilege with respect to the file, directs the cloud storage server module to download preemptively the file to a cloud storage client device of the at least one working group member.

12. The apparatus of claim 11, wherein the at least one working group member includes all of remaining working group members.

13. The apparatus of claim 11, wherein the at least one working group member includes all of remaining working group members who hold the write-privilege.

14. A non-transitory computer readable medium having executable instructions operable to cause an apparatus including a cloud storage directory to:
provide an interface configured to enable a user to form two or more groups, each group having a plurality of group members;
monitor the cloud storage directory including a plurality of files that is shared amongst a plurality of group members of a first working group of the two or more groups, and wherein some of the group members of the first working group are also members of a second working group of the two or more groups;
detect a file activity related to one of the plurality of files, wherein the one of the plurality of files is an active file, and wherein the file activity includes a copy of the active file being downloaded from the cloud storage directory to a working group member's cloud storage client device at a request from the working group member;
upon detecting the file activity, update a profile associated with the active file, wherein the profile is updated for one of (1) incrementing a total number, or (2) re-calculating a percentage, of working group members who requested to download the copy of the active file;
determine, based on the updated profile, whether to distribute the active file to at least one working group member by applying a configurable file-distribution policy that includes at least one rule to the updated profile, wherein the configurable file-distribution policy includes a popularity rule that helps determine whether to distribute preemptively the active file by providing a predetermined minimum number of working group members who have downloaded the copy of the active file for triggering a preemptive distribution of the file;

when it is determined to distribute the active file, distribute the active file by downloading a copy of the active file to one or more cloud storage client devices associated with the at least one working group member, wherein the at least one working group member includes remaining working group members who have not yet downloaded the copy of the active file; and distribute the active file to all members of the second working group when a total number of the group members of the first working group who are also members of the second working group exceeds a predetermined threshold number included in the configurable file-distribution policy.

* * * * *